M. P. REYNOLDS.
SEED TESTING DEVICE.
APPLICATION FILED APR. 20, 1912.
1,044,247.
Patented Nov. 12, 1912.
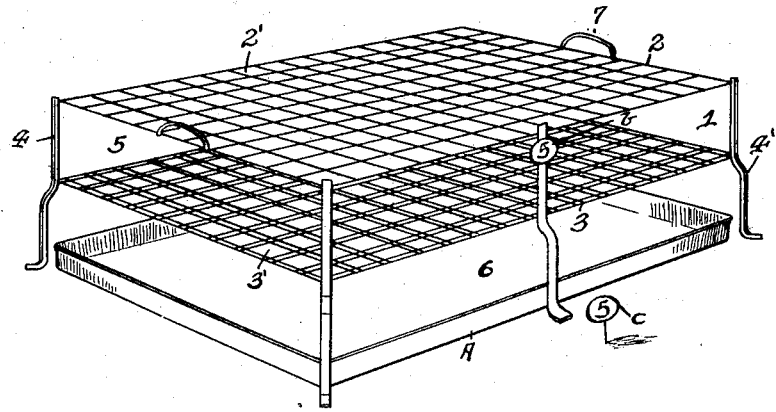
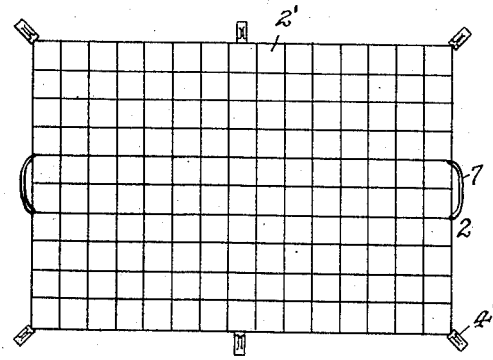
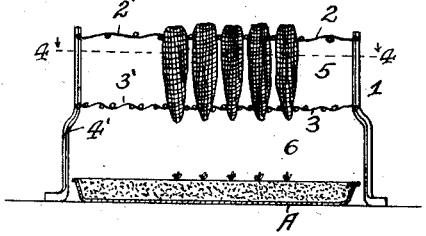
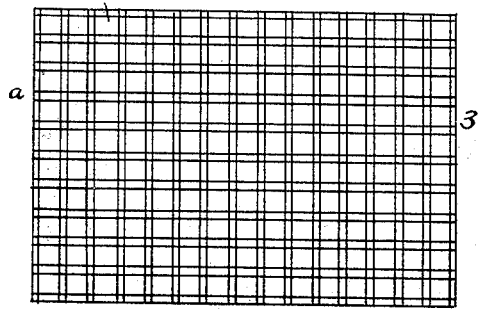
Witnesses:
Inventor:
Morley P. Reynolds
By J. A. Cookes
Attorney

200# UNITED STATES PATENT OFFICE.

MORLEY P. REYNOLDS, OF CLEVELAND, OHIO.

SEED-TESTING DEVICE.

1,044,247.

Specification of Letters Patent. Patented Nov. 12, 1912.

Application filed April 20, 1912. Serial No. 692,149.

*To all whom it may concern:*

Be it known that I, MORLEY P. REYNOLDS, a resident of Cleveland, in the county of Cuyahoga and State of Ohio, have invented a new and useful Improvement in Seed-Testing Devices; and I do hereby declare the following to be a full, clear, and exact description thereof.

My invention relates to a seed testing device, and has special reference to such a device for the testing of seed corn.

The object of my invention is to provide a cheap, simple and efficient seed testing device in which each particular ear of a series of corn ears to be tested is so supported with relation to the seeds to be germinated therefrom as to enable the certainty of the germination to such ear, while the different seeds from each of such ears are so classified or separated, so that the seeds from one source cannot interfere with those of another source, and the testing operation can be carried on with certainty of the identification of the seeds.

To these ends my invention consists, generally stated, in the novel arrangement, construction and combination of parts, as hereinafter more specifically set forth and described and particularly pointed out in the claims.

To enable others skilled in the art to which my invention appertains to construct and use my improved seed testing device I will describe the same more fully, referring to the accompanying drawing, in which—

Figure 1 is a perspective view showing my improved seed testing device in position for operation. Fig. 2 is a top plan view of the device. Fig. 3 is a cross-section of the device showing the process of germination. Fig. 4 is a section of the device on the line 4—4 of Fig. 3, looking in the direction of the arrow.

Like symbols of reference herein indicate like parts in each of the figures of the drawing.

As illustrated in the drawing my improved seed testing device is shown as made in the form of a stand or rack frame 1 and comprises an upper frame 2 and a lower frame 3 both horizontally disposed. These frames 2 and 3 are preferably of rectangular shape and are preferably formed from suitable metallic fabrics, such as woven wire cloth or screens, which are preferably cut to the same size and can be connected together by means of the supporting bars 4 around the same. The supporting bars 4 will enable the separation of the frames 2 and 3 so as to form the space 5 between such frames, and are adapted to have leg portions 4' extending below the lower frame 3 to support the rack or stand 1 and form the space 6 between said frame and the bottom of such leg portions for the purpose hereinafter described. The openings or meshes 2' in the upper frame 2 are larger and of wider area than the openings or meshes 3' in the lower frame 3, which may be formed by the wires of the cloth or screen in the lower frame being formed of double warp and weft wires, such as shown at *a*, in order that the openings or meshes in each of said frames will register with each other by the center lines in each for the purpose hereinafter described.

In the use of my improved seed testing device a receptacle or tray A is placed on the ground or place desired for the testing of the seeds and such tray filled with the earth desired for the test. The rack frame 1 is placed over the tray A, so that the tray is confined in the space 6 between the lower frame 3 on said rack and such ground and between the legs 4' on such rack in their resting on the ground in the supporting of the rack over said tray. Each ear of corn desired to be tested is placed vertically in the receptacles formed by the meshes on openings 2' and 3' in the frames 2 and 3 respectively, with the small end of the ear being supported by the sides of the openings 3' in the lower frame 3 and the large end of the ear being supported by the sides of the openings 2' in the upper frame 2, while such smaller openings in the lower frame will also support its ear in position and prevent the same from dropping down or through the rack frame onto the grains of corn from the same as they are passing through the process of germination, as hereinafter described. A sample of five or six grains of corn taken from each ear resting in the pockets formed by the openings 2' and 3' in the frames 2 and 3 respectively is laid on the earth in the tray A directly under each ear from which such sample is taken, so that when you lift an ear from one of such pockets, one can observe the particular condition of the grains on the earth as taken from such ear in order to determine if such grains have sprouted or not, which sprouting is done by having the earth in the tray A contain sufficient moisture to terminate or sprout such grains. When the grains are thus in position in earth in the tray A and the moisture added to such earth by water to the same, either by pouring or from rains, a suitable piece of cloth or covering is placed on the frame 1 and tray, which will allow the required moisture and heat to germinate the grains of corn in such tray when such tray and frame are placed in the sun or other place suitable for the germination of the corn grains.

If desired the tray A can be provided with a suitable number or character and a corresponding number or character provided on the rack frame 1 in line with each other, such as is shown at b and c respectively in Fig. 1 so as to identify the particular ears from which the grains are taken as tabulated, or in case the rack frame 1 is taken away or removed from the tray for any purpose and then replaced for observation of the process of germination, while if desired the tray A may be dispensed with and any suitable earth or ground desired used for the germination under the rack frame 1, in which case suitable identification means, such as above described, be used on such earth and frame as between the ear on such frame and the grains from the same in such earth. The rack frame 1 can also be provided with handles 7 connected to the upper frame 2 in any suitable manner to lift or place the frame or carry the same.

Various other modifications and changes in the design and construction of my improved seed testing device may be resorted to without departing from the spirit of the invention or sacrificing any of its advantages.

It will thus be seen that in the use of my improved seed testing rack frame it is possible to look through the different pockets therein to observe if the grains for the particular ears in such receptacles have sprouted or not, so that one can instantly know if the ears are satisfactory or not, which enable it to be a practical and simple method, as well as an easy manner of handling the germinating process.

It will be obvious that the tray can be placed at any place desired and away from the receptacles without fear of losing the identification of the particular grains therein or the particular ear from which such grains were taken when the tray is returned and placed in the same position under the rack frame or vice versa.

The device can be formed of marketable or stock goods, can be easily handled and being formed of wire cloth will enable the air to fully circulate around the device in the germinating process.

What I claim as my invention and desire to secure by Letters-Patent is—

1. A testing device for a seed germinating bed, comprising supporting means for removably holding ears of corn vertically over the bed, whereby upon the removal of any ear the germination of the seed from said ear can be observed.

2. A testing device for a seed germinating bed, comprising supporting frames having openings therein registering with each other for removably holding ears of corn vertically over the bed, whereby upon the removal of any ear the germination of the seed from said ear can be observed.

3. A testing device for a seed germinating bed, comprising upper and lower supporting frames spaced from each other and having openings therein registering with each other for removably holding ears of corn vertically over the bed, whereby upon the removal of any ear the germination of the seed from said ear can be observed, said openings in the lower frame being smaller than those in the upper frame.

4. A testing device for a seed germinating bed comprising a supporting means formed of wire cloth or screen for removably holding ears of corn vertically over the bed, whereby upon the removal of any ear the germination of the seed from said ear can be observed.

5. A testing device for a seed germinating bed comprising supporting frames formed of wire cloth or screen having the meshes therein registering with each other for removably holding ears of corn vertically over the bed, whereby upon the removal of any ear the germination of the seed from said ear can be observed.

6. A testing device for a seed germinating bed comprising upper and lower supporting frames spaced from each other and formed of wire cloth or screen for removably holding ears of corn vertically over the bed, whereby upon the removal of any ear the germination of the seed from said ear can be observed, the meshes in the lower frame being smaller than those in the upper frame.

7. A seed testing device for a seed germinating bed, comprising a supporting stand for removably holding ears of corn vertically over the bed, whereby upon the removal of any ear the germination of the seed from said ear can be observed, and legs on said stand to support the same and form a space under said stand.

8. A testing device for a seed germinating bed comprising a supporting stand formed of wire cloth or screen for removably holding ears of corn over the bed, whereby upon the removal of any ear the germination of the seed from said ear can be observed, and legs on said stand to support the same and form a space under said stand.

9. A testing device for a seed germinating bed, comprising a stand of supporting frames having openings therein registering with each other for removably holding ears of corn vertically over the bed, whereby upon the removal of any ear the germination of the seed from said ear can be observed, and legs on said stand to support the same and form a space under the lower frame.

10. A testing device for a seed germinating bed, comprising a stand of upper and lower supporting frames spaced from each other and having openings therein registering with each other for removably holding ears of corn vertically over the bed, whereby upon the removal of any ear the germination of the seed of said ear can be observed, said openings in the lower frame being smaller than those in the upper frame, and legs on said stand to support the same and form a space under the lower frame.

11. A testing device for a seed germinating bed comprising a stand of supporting frames of wire cloth or screen having the meshes therein registering with each other for removably holding ears of corn vertically over the bed, whereby upon the removal of any ear the germination of the seed from said ear can be observed, and legs on said stand to support the same and form a space under the lower frame.

12. A testing device for a seed germinating bed comprising a stand of upper and lower supporting frames spaced from each other and formed of wire cloth or screen for removably holding ears of corn over the bed, whereby upon the removal of any ear the germination of the seed from said ear can be observed, the meshes in the lower frame being smaller than those in the upper frame, and legs on said stand to support the same and form a space under the lower frame.

In testimony whereof, I the said MORLEY P. REYNOLDS, have hereunto set my hand.

MORLEY P. REYNOLDS.

Witnesses:
C. C. FLINT,
I. WIEGERT.